United States Patent
Seo et al.

(10) Patent No.: US 11,689,812 B2
(45) Date of Patent: Jun. 27, 2023

(54) CAMERA SYSTEM INCLUDED IN VEHICLE AND CONTROL METHOD THEREFOR

(71) Applicant: SAMSUNG ELECTRONICS CO., LTD., Suwon-si (KR)

(72) Inventors: Jeonghoon Seo, Suwon-si (KR); Sanggun Lee, Suwon-si (KR); Hyeongchan Seo, Suwon-si (KR); Taejung Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 17/279,368

(22) PCT Filed: Oct. 30, 2019

(86) PCT No.: PCT/KR2019/014474
§ 371 (c)(1),
(2) Date: Mar. 24, 2021

(87) PCT Pub. No.: WO2020/096263
PCT Pub. Date: May 14, 2020

(65) Prior Publication Data
US 2021/0400194 A1    Dec. 23, 2021

(30) Foreign Application Priority Data
Nov. 7, 2018  (KR) .......................... 10-2018-0136010

(51) Int. Cl.
*H04N 5/232*    (2006.01)
*B60W 40/04*    (2006.01)
(Continued)

(52) U.S. Cl.
CPC .......... *H04N 23/698* (2023.01); *B60W 40/04* (2013.01); *G06V 10/22* (2022.01); *G06V 10/96* (2022.01);
(Continued)

(58) Field of Classification Search
None
See application file for complete search history.

(56) References Cited

U.S. PATENT DOCUMENTS

| 6,535,242 B1 | 3/2003 | Strumolo et al. |
| 8,957,992 B2 * | 2/2015 | Sutton ............... H01L 27/14605 |
| | | 348/340 |

(Continued)

FOREIGN PATENT DOCUMENTS

| EP | 2 731 076 | 5/2014 |
| JP | 2014-202760 | 10/2014 |

(Continued)

OTHER PUBLICATIONS

International Search Report for PCT/KR2019/014474, with English translation, dated Feb. 11, 2020, 4 pages.

(Continued)

*Primary Examiner* — Edemio Navas, Jr.
(74) *Attorney, Agent, or Firm* — Nixon & Vanderhye, P.C.

(57) ABSTRACT

Disclosed is a camera system included in a vehicle. The camera system comprises: a camera provided to a vehicle so as to capture the surroundings of the vehicle; and a processor for identifying an object present near the vehicle on the basis of an image captured by the camera, wherein the camera comprises a wide-angle lens, and a plurality of optical sensors for capturing a region within the viewing angle of the wide-angle lens, the wide-angle lens being designed so that the number of optical sensors for capturing a region corresponding to a predetermined angle range, among a plurality of angle ranges formed by dividing the viewing angle into predetermined angles, differs from the number of optical sensors for capturing a region corresponding to a different angle range.

12 Claims, 13 Drawing Sheets

(51) Int. Cl.
  *G06K 9/00* (2022.01)
  *G06K 9/20* (2006.01)
  *H04N 5/247* (2006.01)
  *H04N 23/698* (2023.01)
  *G06V 10/96* (2022.01)
  *G06V 10/22* (2022.01)
  *G06V 20/56* (2022.01)
  *H04N 23/80* (2023.01)
  *H04N 23/90* (2023.01)
  *G06V 10/25* (2022.01)

(52) U.S. Cl.
  CPC ............. *G06V 20/56* (2022.01); *H04N 23/80* (2023.01); *H04N 23/90* (2023.01); *B60W 2420/42* (2013.01); *B60W 2554/00* (2020.02); *G06V 10/25* (2022.01)

(56) References Cited

U.S. PATENT DOCUMENTS

| | | |
|---|---|---|
| 2011/0228980 A1 | 9/2011 | Ichikawa et al. |
| 2011/0267452 A1 | 11/2011 | Notsu et al. |
| 2012/0262580 A1 | 10/2012 | Huebner et al. |
| 2012/0287232 A1 | 11/2012 | Natroshvili et al. |
| 2014/0169630 A1 | 6/2014 | Fukata et al. |
| 2014/0347450 A1* | 11/2014 | Han ...................... G06T 3/0031 348/47 |
| 2015/0189140 A1 | 7/2015 | Sutton et al. |
| 2016/0379381 A1* | 12/2016 | Krutsch .................. G06T 15/04 345/426 |
| 2019/0135181 A1* | 5/2019 | King ........................ B60R 1/00 |
| 2019/0202356 A1* | 7/2019 | Cano ..................... H04N 5/2628 |
| 2019/0369299 A1* | 12/2019 | Yamamoto ....... B29D 11/00403 |

FOREIGN PATENT DOCUMENTS

| | | |
|---|---|---|
| KR | 10-2013-0071842 | 7/2013 |
| KR | 10-2015-0077287 | 7/2015 |
| KR | 10-2015-0101205 | 9/2015 |
| WO | 2017/039277 | 3/2017 |

OTHER PUBLICATIONS

Written Opinion of the ISA for PCT/KR2019/014474, with English translation, dated Feb. 11, 2020, 10 pages.
Office Action for KR10-2018-0136010, with English translation, dated Jun. 16, 2020, 14 pages.

* cited by examiner

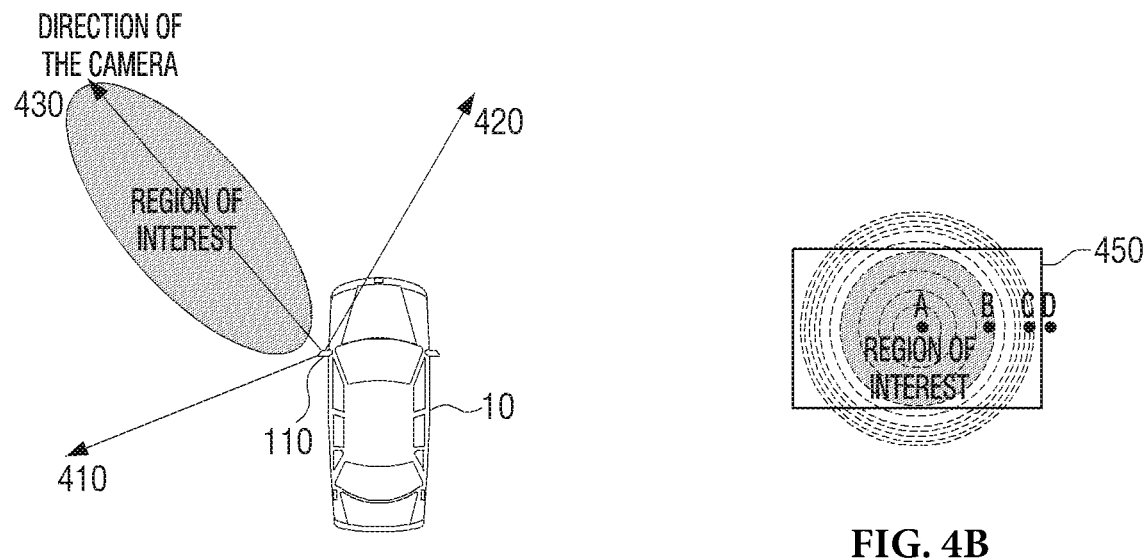
FIG. 4A
FIG. 4B
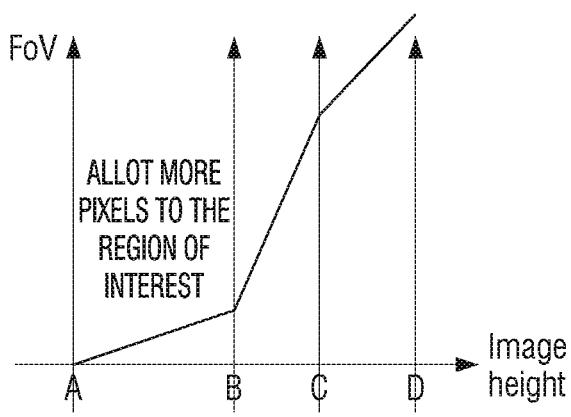
FIG. 4C

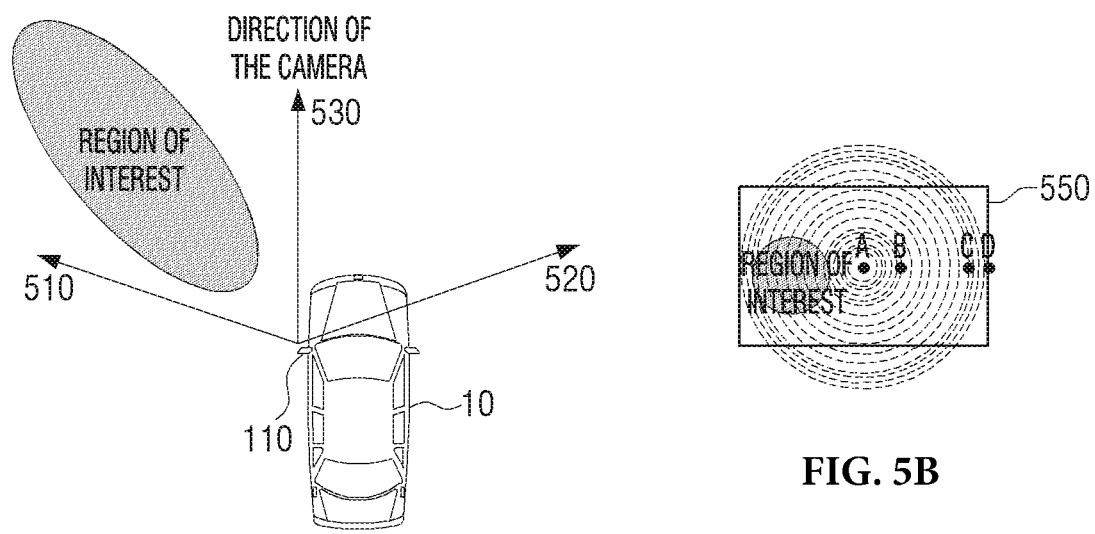
FIG. 5A
FIG. 5B
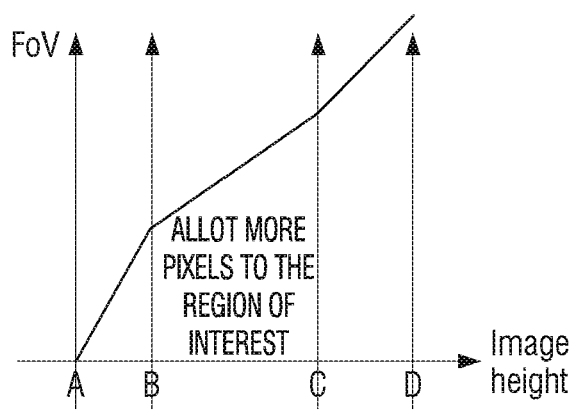
FIG. 5C

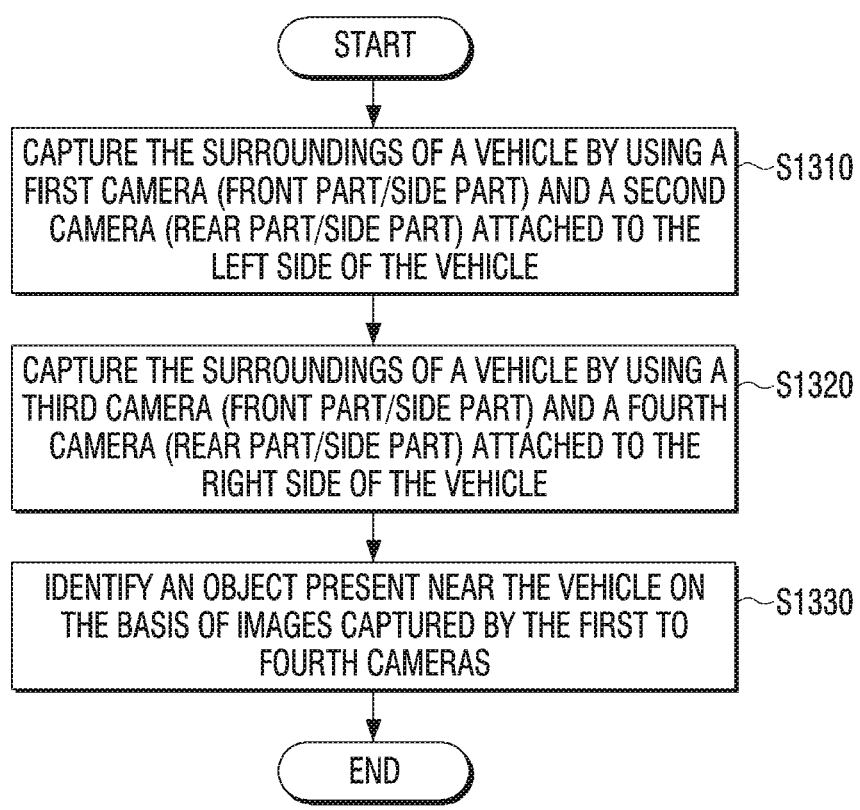

CAMERA SYSTEM INCLUDED IN VEHICLE AND CONTROL METHOD THEREFOR

This application is the U.S. national phase of International Application No. PCT/KR2019/014474 filed 30 Oct. 2019, which designates the United States and claims priority to KR Patent Application No. 10-2018-0136010 filed 7 Nov. 2018, the entire contents of each of which are hereby incorporated by reference.

BACKGROUND

1. Field

The disclosure relates to a camera system and advanced driver assistance systems included in a vehicle, and more particularly, to a camera system for identifying a dangerous object near a vehicle by using a wide-angle lens for photographing a wide range near the vehicle.

2. Description of Related Art

For safety of a driver driving a vehicle such as an automobile, various advanced driver assistant systems (ADAS) are being mounted on vehicles.

In particular, camera systems that photograph the front part, the rear part, the side surfaces, etc. of an automobile by using a camera attached to the automobile, and recognize dangerous factors nearby are being manufactured and used in various ways.

As conventional camera systems, there were a front camera system that recognizes dangerous factors in the front part by using a single or stereo camera, a rear/side camera system that recognizes dangerous factors in the rear part and the side part by using rear/side cameras, a surround view monitoring (SVM) camera system that recognizes dangerous factors in near front/rear/side parts by using front/rear/side cameras, etc.

FIG. 1A to FIG. 1E are diagrams for briefly illustrating conventional camera systems attached to automobiles.

FIG. 1A illustrates an object recognition region of a front camera system using a stereo camera attached to the front part of an automobile, FIG. 1B illustrates an object recognition region of a rear/side camera system using rear/side cameras attached to side mirrors of an automobile, and FIG. 1C illustrates an object recognition region of an SVM camera system that uses four cameras attached to each of the front part and the rear part and side mirrors on the left/right sides.

In the past, in the aforementioned camera systems, not only the regions recognizing objects are different from one another, but also the roles themselves are different from one another, and thus each of the systems was controlled by a separate electronic control unit (ECU).

Accordingly, on an automobile including all of the aforementioned conventional camera systems, eight cameras and three ECUs in total had to be mounted as in FIG. 1D, and accordingly, the design and the wiring became complex, and thus there were not only the problem of the installation cost, but also the problem that there was an insufficient loading space of the vehicle. In addition, electromagnetic wave/noise interferences among the aforementioned camera systems could not be ignored, either, and as the time periods of usage of the aforementioned camera systems are different (ex. as the SVM function is not necessary during high speed driving of the vehicle, the SVM camera system is in an idle state), there was a problem that some camera system resources got into an idle state depending on circumstances and the system resources were wasted.

Also, although not illustrated in FIG. 1D, the fact that, for integrated control of an automobile, etc., an integrated ECU for receiving information from each ECU of the aforementioned camera systems and controlling each ECU is separately needed was also a difficult point in design and implementation.

In addition, referring to FIG. 1E, blind spots that were not photographed even though all of the aforementioned camera systems were used existed over a relatively wide range.

SUMMARY

The purpose of the disclosure is in providing an integrated camera system that is capable of effectively recognizing dangerous factors over a wide region including not only regions that could be photographed by the conventional camera systems but also blind spots that could not be photographed by the conventional camera systems by using an effective arrangement structure for wide-angle lens cameras in a relatively small number and only one integrated processor, and a control method therefor.

Also, another purpose of the disclosure is in providing a camera system that is capable of more precise object recognition for a region corresponding to an angle range having high importance among the regions within a viewing angle of a wide-angle lens, in consideration of the disadvantage of a wide-angle lens that, even though it can acquire an image for a wide range, the precision is relatively reduced, and a control method therefor through the disclosure.

Further, the disclosure is aimed at providing a camera system that identifies a region of interest for images photographed through a plurality of cameras according to a state of a vehicle wherein the camera system is provided, and effectively recognizes an object that exists near the vehicle based on the identified region of interest, and a control method therefor.

A camera system included in a vehicle according to an embodiment of the disclosure includes a camera provided in the vehicle to capture surroundings of the vehicle and a processor for identifying an object present near the vehicle on the basis of an image captured by the camera, wherein the camera includes a wide-angle lens and a plurality of optical sensors for capturing a region within the viewing angle of the wide-angle lens, and the wide-angle lens is designed such that the number of optical sensors for capturing a region corresponding to a predetermined angle range, among a plurality of angle ranges wherein the viewing angle is divided into predetermined angles, differs from the number of optical sensors for capturing a region corresponding to a different angle range.

Here, the wide-angle lens may be designed such that the number of optical sensors for capturing a region corresponding to the predetermined angle range is greater than the number of optical sensors for capturing a region corresponding to the different angle range.

Also, in an image captured by the camera, the number of pixels included in a region captured in the predetermined angle range may be greater than the number of pixels included in a region captured in the different angle range.

Meanwhile, the predetermined angle range may be predetermined on the basis of the angle at which the camera is arranged in the vehicle.

Also, the predetermined angle range may be predetermined on the basis of the structure of the vehicle and a field of view of a user who is riding the vehicle.

Meanwhile, the camera may include a first camera attached to the left side of the vehicle to capture the front part and the left side of the vehicle and a second camera attached to the left side of the vehicle to capture the rear part and the left side of the vehicle and a third camera attached to the right side of the vehicle to capture the front part and the right side of the vehicle and a fourth camera attached to the right side of the vehicle to capture the rear part and the right side of the vehicle.

Here, the processor may, on the basis of at least one of the speed and the driving direction of the vehicle, identify a main region within each image captured by the first to fourth cameras, and identify an object present near the vehicle on the basis of the identified main region.

In this case, the processor may, based on the size of the main region being greater than a predetermined value, reduce the amount of operations for identifying an object within the region of interest to smaller than or equal to the predetermined value.

Also, the processor may, for a main region identified within an image captured by the camera attached in a location corresponding to the driving direction of the vehicle among the first to fourth cameras, perform more operations for object identification than for the main regions identified within images captured by the other cameras, and identify an object present near the vehicle.

In addition, the camera system may further include a serializer integrated circuit (IC) that receives in parallel data corresponding to a plurality of images captured at the first to fourth cameras and transmits the data to the processor.

Further, the processor may identify the degree of danger of the object on the basis of information on the identified object, and control the vehicle on the basis of the identified degree of danger.

A control method for a camera system included in a vehicle according to an embodiment of the disclosure includes the steps of capturing the surroundings of the vehicle by using a camera provided in the vehicle, and identifying an object present near the vehicle on the basis of an image captured by the camera, wherein the camera includes a wide-angle lens and a plurality of optical sensors for capturing a region within the viewing angle of the wide-angle lens, and the wide-angle lens is designed such that the number of optical sensors for capturing a region corresponding to a predetermined angle range, among a plurality of angle ranges wherein the viewing angle is divided into predetermined angles, differs from the number of optical sensors for capturing a region corresponding to a different angle range.

A control method for a camera system included in a vehicle according to another embodiment of the disclosure includes the steps of capturing the surroundings of the vehicle by using a first camera attached to the left side of the vehicle to capture the front part and the left side of the vehicle and a second camera attached to the left side of the vehicle to capture the rear part and the left side of the vehicle, capturing the surroundings of the vehicle by using a third camera attached to the right side of the vehicle to capture the front part and the right side of the vehicle and a fourth camera attached to the right side of the vehicle to capture the rear part and the right side of the vehicle, and identifying an object present near the vehicle on the basis of images captured by the first to fourth cameras, wherein each of the first to fourth cameras comprises a wide-angle lens and a plurality of optical sensors for capturing a region within the viewing angle of the wide-angle lens, and the wide-angle lens is designed such that the number of optical sensors for capturing a region corresponding to a predetermined angle range, among a plurality of angle ranges wherein the viewing angle is divided into predetermined angles, differs from the number of optical sensors for capturing a region corresponding to a different angle range.

Here, the control method may further include the steps of, on the basis of at least one of the speed and the driving direction of the vehicle, identifying a main region within each image captured by the first to fourth cameras, and identifying an object present near the vehicle on the basis of the identified main region.

In this case, the step of identifying an object present near the vehicle may include the step of, based on the size of the region of interest being greater than a predetermined value, reducing the amount of operations for identifying an object within the main region to smaller than or equal to the predetermined value.

Also, in the step of identifying an object present near the vehicle, for a main region identified within an image captured by the camera attached in a location corresponding to the driving direction of the vehicle among the first to fourth cameras, more operations for object identification may be performed than for the main regions identified within images captured by the other cameras, and an object present near the vehicle may be identified.

Also, the control method may further include the steps of identifying the degree of danger of the object on the basis of information on the identified object, and controlling the vehicle on the basis of the identified degree of danger.

The camera system according to the disclosure captures a wider range by using a wide-angle lens, and the wide-angle lens is designed such that, for a specific region in a captured region, the number of pixels corresponding to each region becomes different for securing precision, and thus there is an effect that precision of object recognition can be provided.

The camera system using four cameras according to the disclosure can capture a wider range compared to a combination of conventional camera systems, and at the same time, the design and the wiring became simpler, and there are effects of securing a space and reducing the cost. In particular, by virtue of the characteristic of the camera system of being able to prepare for all dangerous factors near a vehicle with only one camera system, the camera system can be used usefully for autonomous cars in the future.

The camera system according to the disclosure can capture wide regions in the front/rear/left/right parts of a vehicle with only one camera system, and can thus avoid electromagnetic wave/noise interferences between systems.

By virtue of the characteristic of the camera system according to the disclosure that each camera captures a relatively wide range, there is less possibility that an idle state of a specific camera may occur according to the circumstance of a vehicle, and as a result, waste of system resources can be reduced.

Also, the camera system according to the disclosure can recognize images and objects in all directions near a vehicle through one processor. This makes software design of the camera system simpler, and makes the system advantageous for being used in autonomous cars in the future.

BRIEF DESCRIPTION OF THE DRAWINGS

FIGS. 4A, 4B, and 4C are diagrams for illustrating an embodiment wherein a wide-angle lens is designed according to an installation angle of a camera;

FIGS. 5A, 5B, and 5C are diagrams for illustrating an embodiment wherein a wide-angle lens is designed according to an installation angle of a camera;

FIG. 13 is a flow chart for illustrating a control method for a camera system including four cameras according to an embodiment of the disclosure.

DETAILED DESCRIPTION

Figure 1A:
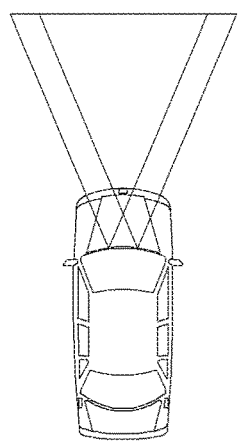
FIGS. 1A, 1B, 1C, 1D, and 1E are diagrams for schematically illustrating camera systems for automobiles that were conventionally used.
Figure 1B:
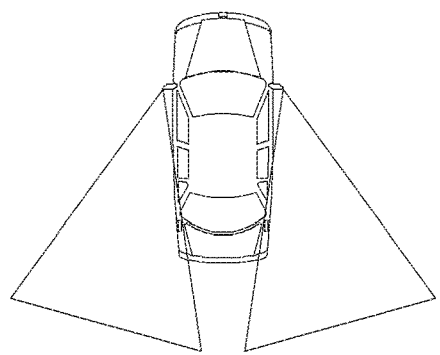
Figure 1C:
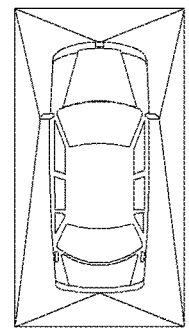
Figure 1D:
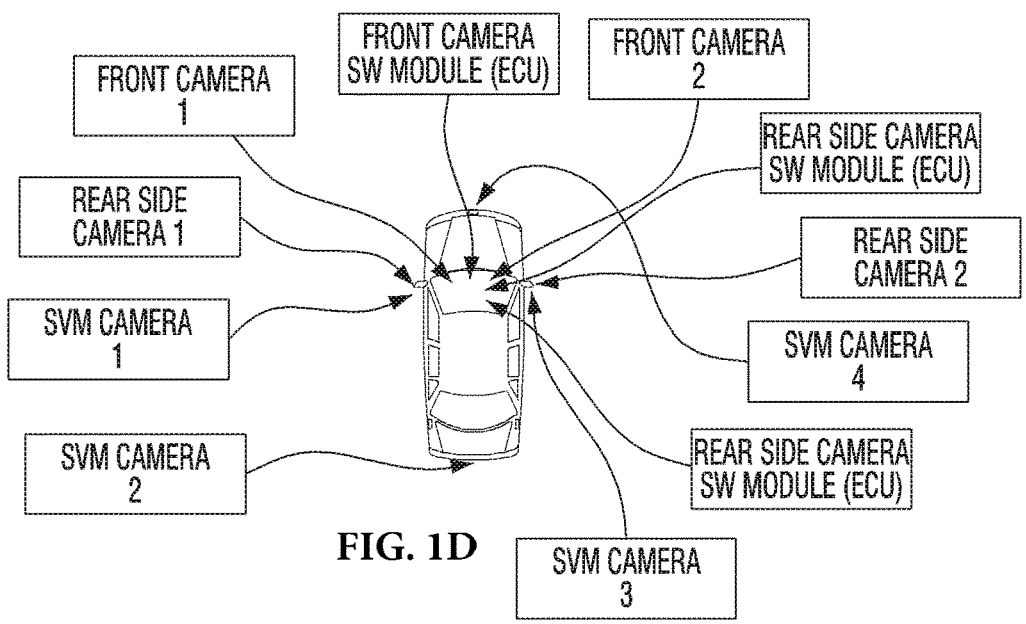

Before describing the disclosure in detail, the description format of this specification and the drawings will be described.

First, as terms used in this specification and the claims, general terms were selected in consideration of the functions in the various embodiments of the disclosure. However, the terms may vary depending on the intention of those skilled in the art who work in the pertinent technical field, legal or technical interpretation, or emergence of new technologies. Also, in some cases, there are terms that were arbitrarily designated by the applicant, and in such cases, the meaning of the terms may be interpreted as defined in this specification. In case there is no specific definition of the terms, the meaning of the terms may be interpreted based on the overall content of this specification and common technical knowledge in the pertinent technical field.

Also, the same reference numerals or symbols described in each drawing accompanying this specification indicate parts or components that perform substantially the same functions. For the convenience of explanation and understanding, the parts or components will be described by using the same reference numerals or symbols in different embodiments. That is, even if all of a plurality of drawings illustrate components having the same reference numerals, the plurality of drawings do not refer to one embodiment.

In addition, in this specification and the claims, terms including ordinal numbers such as "the first," "the second," etc. may be used for distinguishing components. These ordinal numbers are used to distinguish the same or similar components from one another, and the meaning of the terms are not to be interpreted in a restrictive way due to use of such ordinal numbers. For example, the orders of usage or the orders of arrangement, etc. of components combined with such ordinal numbers are not to be restricted by the numbers. Also, depending on needs, each ordinal number may be interchangeably used.

In this specification, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the embodiments of the disclosure, terms such as "a module," "a unit," and "a part" are for referring to elements performing at least one function or operation, and these elements may be implemented as hardware or software, or as a combination of hardware and software. Further, a plurality of "modules," "units," and "parts" may be integrated into at least one module or chip and implemented as at least one processor, except when each of them needs to be implemented as independent specific hardware.

In addition, in the embodiments of the disclosure, the description that a portion is connected to another portion includes both the case where a portion is directly connected to another portion, and the case where a portion is indirectly connected to another portion through still another medium. Also, the description that a portion includes an element means that other elements may additionally be included, but not that other elements are excluded, unless there is any specific description meaning the contrary.

Figure 2:
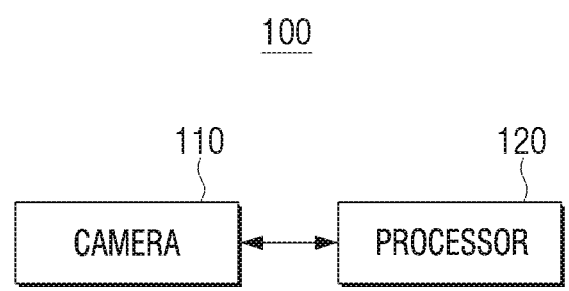
FIG. 2 is a block diagram for illustrating essential components of a camera system according to an embodiment of the disclosure.

FIG. 2 is a block diagram for illustrating essential components of a camera system 100 according to an embodiment of the disclosure. The camera system 100 is generally provided in a vehicle.

Referring to FIG. 2, the camera system 100 includes a camera 110 and a processor 120.

The camera 110 is a component for acquiring an image for the surroundings of a vehicle by being provided in the vehicle and capturing the surroundings of the vehicle. Here, the vehicle may mean various transportation means such as an automobile, a motorcycle, a bicycle, a train, a ship, an airplane, a spaceship, etc.

In case the vehicle is an automobile, the camera 110 may be attached to any one of the side mirrors on the left/right sides of the automobile and capture the surroundings of the automobile.

Figure 3:
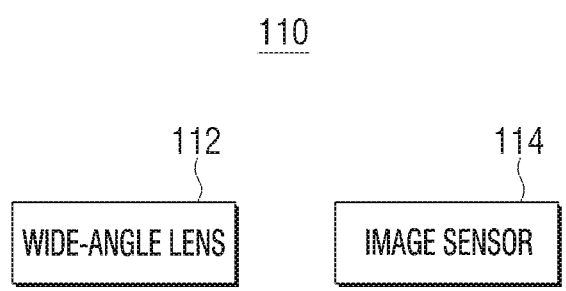
FIG. 3 is a block diagram for illustrating components of at least one camera included in the camera system.

FIG. 3 is a block diagram for illustrating components of the camera 110. Referring to FIG. 3, the camera 110 may include a wide-angle lens 112 and an image sensor 114.

The wide-angle lens 112 may receive ambient lights of the vehicle and transmit the lights to the image sensor 114. The wide-angle lens 112 may also be implemented as a super-wide-angle lens such as a fish-eye lens.

The image sensor 114 may capture a region within the viewing angle of the wide-angle lens 112 by recognizing ambient lights gathered through the wide-angle lens 112. Specifically, the image sensor 114 may convert recognized ambient lights into electronic signals.

The image sensor 114 may include a plurality of optical sensors for recognizing ambient lights gathered through the wide-angle lens 112. The optical sensors are components for converting input lights into electronic signals, and they may be implemented as light diodes.

The image sensor 114 may be implemented as a charge coupled device (CCD), a complementary metal-oxide-semiconductor (CMOS), etc.

The camera 110 may capture the surroundings of the vehicle on the basis of control by the processor 120. Then, the processor 120 may identify an object present near the vehicle on the basis of the image captured by the camera 110.

In the case of using the camera 110 including the wide-angle lens 112, there is an advantage that a region of a relatively wide range can be captured, but there is a disadvantage that the precision of the captured image is reduced.

Accordingly, the wide-angle lens 112 of the camera 110 may be designed such that the number of optical sensors for capturing a region corresponding to a predetermined angle range, among a plurality of angle ranges wherein the viewing angle (the range of a maximum view) of the wide-angle lens 112 is divided into predetermined angles, differs from the number of optical sensors for capturing a region corresponding to a different angle range. Here, the wide-angle lens 112 may be designed such that, while the intervals among the plurality of optical sensors included in the image sensor 114 are regular, the refractive index for each region of the wide-angle lens 112 suits the aforementioned content.

Specifically, the wide-angle lens 112 may be designed such that the number of optical sensors for capturing a region corresponding to the predetermined angle range is greater than the number of optical sensors for capturing a region corresponding to the different angle range.

As a result, in an image captured by the camera 110, the number of pixels included in a region captured in the predetermined angle range of the wide-angle lens 112 may be greater than the number of pixels included in a region captured in the different angle range.

As described above, as a result of using the wide-angle lens 112 designed such that the number of pixels corresponding to each of the plurality of angle ranges within the viewing angle varies, the camera system 100 can not only capture a wider range compared to a case of using a general lens, but can also perform more precise object recognition for a relatively more important region of a captured image than other regions.

FIG. 4A to FIG. 4C, and FIG. 5A to FIG. 5C are diagrams for illustrating an embodiment wherein a wide-angle lens is designed according to an installation angle of a camera.

In FIG. 4A to FIG. 4C, and FIG. 5A to FIG. 5C, the predetermined angle range is predetermined to include a predetermined region of interest among regions within the viewing angle of the wide-angle lens 112.

FIG. 4A illustrates a case wherein the camera 110 is attached to the side mirror on the left side of the automobile 10 which is a vehicle, and at the same time, the camera 110 is arranged such that the direction 430 which the camera 110 and the center of the wide-angle lens 112 is toward is the front part on the left side from the viewpoint of the driver of the automobile 10.

Here, the camera 110 may capture regions within the direction 410 and the direction 420 corresponding to the viewing angle.

Meanwhile, referring to FIG. 4A, it can be identified that, among the regions within the viewing angle of the wide-angle lens 112, a region adjacent to the direction 430 which the camera 110 is toward (the direction which the center of the wide-angle lens 112 (angle: 0) is toward) is the main region of interest.

In this case, the wide-angle lens 112 may be designed such that, for a predetermined angle range including the aforementioned region of interest among the regions within the viewing angle of the wide-angle lens 112, the number of pixels per unit angle is greater compared to a different angle range.

FIG. 4B illustrates regions corresponding to a plurality of angle ranges wherein the viewing angle of the wide-angle lens 112 is divided by the same angle intervals in an image 450 captured by the camera 110 in FIG. 4A. Here, regions corresponding to the same concentric circle are included in the same angle range.

Referring to FIG. 4B, it can be figured out that, in the image 450 photographed by the camera 110, for the predetermined angle range (A-B) corresponding to the region of interest, the number of pixels per unit angle is greater compared to a different angle range.

FIG. 4C is a graph illustrating the relation of 'Field of View (FoV)-Image Height' with respect to the image 450 illustrated in FIG. 4B.

In the case of a conventional general lens 112, the 'Field of View (FoV)-Image Height' graph has a form of a primary graph of which tilt is almost regular even if the angle section or the Image Height section differs.

In contrast, referring to FIG. 4C, it can be figured out that, as a result of the fact that the number of pixels per unit angle of the 'A-B' angle section is greater compared to the 'B-C' and 'C-D' angle sections, the tilt by which the FoV increases as the Image Height increases is noticeably smaller in the 'A-B' angle section.

Meanwhile, the predetermined angle range may vary according to the angle at which the camera 110 is arranged in the vehicle.

For example, referring to FIG. 5A, the drawing illustrates a case wherein, even though the camera 110 is attached to the side mirror on the left side of the automobile 10 as in FIG. 4A, the camera 110 is toward the front direction 530 from the viewpoint of the driver of the automobile 10 unlike in FIG. 4A wherein the camera 110 is toward the front direction on the left side 430. Here, even though the actual region of interest is the front region on the left side from the viewpoint of the driver of the automobile 10 and is thus the same as in FIG. 4A, the predetermined angle range differs from FIG. 4A.

Referring to FIG. 5A, the camera 110 may capture regions between the direction 510 and the direction 520 corresponding to the viewing angle.

Referring to FIG. 5A, it can be figured out that, among the regions within the viewing angle of the wide-angle lens 112, the region which is more to the left than the direction 530 which the camera 110 is toward (the direction which the center of the wide-angle lens 112 (angle: 0) is toward) is the main region of interest.

In this case, the wide-angle lens 112 may be designed such that, for a predetermined angle range including the aforementioned region of interest among the regions within the viewing angle of the wide-angle lens 112, the number of pixels per unit angle is greater compared to a different angle range.

FIG. 5B illustrates regions corresponding to a plurality of angle ranges wherein the viewing angle of the wide-angle lens 112 is divided by the same angle intervals in an image 550 captured by the camera 110 in FIG. 5A.

Referring to FIG. 5B, it can be figured out that, in the image 550 captured by the camera 110, for the predetermined angle range (B-C) including the region of interest, the number of pixels per unit angle is greater compared to a different angle range.

FIG. 5C is a graph illustrating the relation of 'Field of View (FoV)-Image Height' with respect to the image 550 illustrated in FIG. 5B.

Referring to FIG. 5C, it can be figured out that, as a result of the fact that the number of pixels per unit angle of the 'B-C' angle section is greater compared to the 'A-B' and 'C-D' angle sections, the tilt by which the FoV increases as the Image Height increases is noticeably smaller in the 'B-C' angle section.

Meanwhile, the predetermined angle range may be predetermined on the basis of the structure of the vehicle and a field of view of a user who is riding the vehicle.

For example, a part of a field of view of an automobile driver may be interrupted due to the automobile structure including a car body frame area arranged between the front glass and the glass on the left side or between the front glass and the glass on the right side. In this case, the blind spot where the field of view of the driver does not reach may be the region of interest, and the predetermined angle range may also be predetermined on the basis of this.

The processor 120 may control the overall operations of the camera system 100. As described above, the processor 120 may identify an object near a vehicle on the basis of an image captured by the camera 110.

For this, the processor 120 may include a random access memory (RAM) (not shown), a read only memory (ROM) (not shown), a central processing unit (CPU) (not shown), a graphic processing unit (GPU) (not shown), and a system bus (not shown), etc., and may perform operations or data processing regarding control of one or more components included in the camera system 100.

The processor 120 may be implemented as an electronic control unit (ECU) provided in a vehicle, or as a part of an ECU. In this case, the ECU including the processor 120 may control at least one component of the vehicle according to the result of identifying an object near the vehicle on the basis of an image captured by the camera 110.

The processor 120 may be implemented separately from one or more ECUs provided in a vehicle and perform communication with the ECUs via wire or wirelessly, and thereby control the ECUs or be controlled by the ECUs.

The processor 120 may correct an image captured through the camera 110. In particular, in case the camera 110 uses a super-wide-angle lens such as a fish-eye lens, distortion of the image is generated due to the characteristic of the lens, and thus correction of the image may be indispensable.

Then, the processor 120 may identify an object present in a corrected image or an image that was not corrected. Here, an object may be a person, an automobile, a lane, and other obstacles that hinder the driving of the vehicle, etc.

Here, the processor 120 may identify an object present in an image on the basis of machine learning for object recognition in an image. In this case, the processor 120 may identify an object in an image by using an artificial intelligence model trained based on deep learning for object recognition in an image. Here, the artificial intelligence model may be stored in a storage inside the camera system 100 (not shown) or an outside storage that can communicate with the camera system 100 via wire or wirelessly.

The processor 120 may identify the degree of danger of the object on the basis of information on the identified object, and control the vehicle on the basis of the identified degree of danger. Specifically, the processor 120 may control the vehicle to notify information on the identified object and the degree of danger.

For example, the processor 120 may control the display of the vehicle to display information on the identified degree of danger, or control the speaker of the vehicle to output information on the identified degree of danger in the form of a voice.

In the camera system 100, a case wherein there are a plurality of cameras 110 as well as a case wherein there is only one camera 110 can be assumed. Preferably, a wide field of view of the front/rear/left/right parts of the vehicle may be secured by using four cameras.

Figure 6:
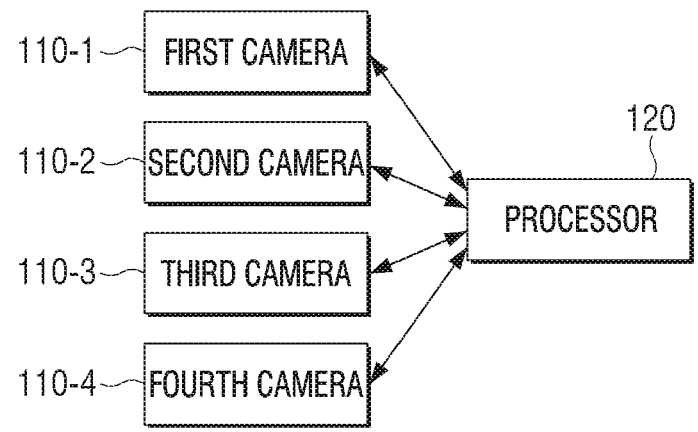
FIG. 6 is a block diagram for illustrating components of a camera system including four cameras according to an embodiment of the disclosure.

FIG. 6 is a block diagram for illustrating components of the camera system 100 including four cameras according to an embodiment of the disclosure.

Referring to FIG. 6, the camera system 100 may include a first camera 110-1, a second camera 110-2, a third camera 110-3, a fourth camera 110-4, and a processor 120.

Here, each of the first to fourth cameras may be designed in the same way as the camera 110 described through FIG. 3 to FIG. 5 above, and perform capturing for the surroundings of the vehicle.

In this case, in designing the wide-angle lens 112 of each of the first to fourth cameras 110-1, 110-2, 110-3, 110-4, the predetermined angles may be implemented to be different from one another. This is because the regions of interest within the viewing ranges captured by each camera may be different from one another.

The first camera 110-1 may be attached to the left side of the vehicle, and capture the front part and the left side of the vehicle, the second camera 110-2 may be attached to the left side of the vehicle, and capture the left side and the rear part of the vehicle, the third camera 110-3 may be attached to the right side of the vehicle, and capture the front part and the right side of the vehicle, and the fourth camera 110-4 may be attached to the right side of the vehicle, and capture the rear part and the right side of the vehicle.

Here, the first camera 110-1 and the second camera 110-2 may be attached to the side mirror on the left side of the vehicle, and the third camera 110-3 and the fourth camera 110-4 may be attached to the side mirror on the right side of the vehicle.

FIG. 7A to FIG. 7D are diagrams for illustrating an object recognition range (a capturing range) of a camera system including four cameras provided in an automobile 10, in case the vehicle is an automobile 10.

Figure 7A:
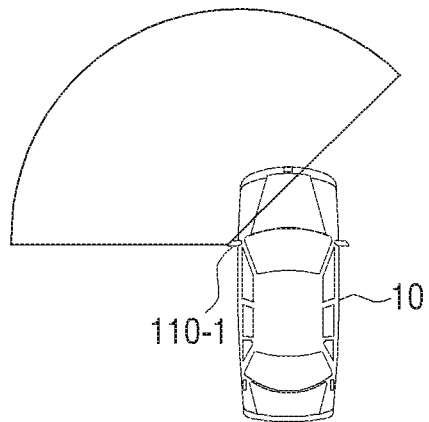
FIGS. 7A, 7B, 7C, and 7D are diagrams for illustrating an object recognition range (a capturing range) of a camera system including four cameras.
Figure 7B:
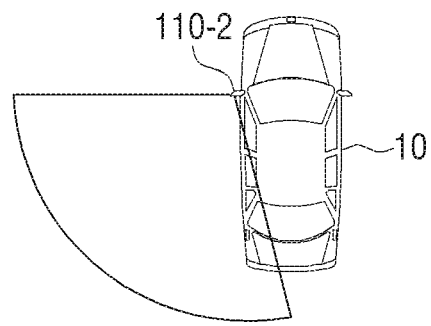

Referring to FIG. 7A and FIG. 7B, the drawings respectively illustrate the viewing ranges of the first camera 110-1 and the second camera 110-2 attached to the side mirror on the left side of the automobile 10.

Figure 7C:
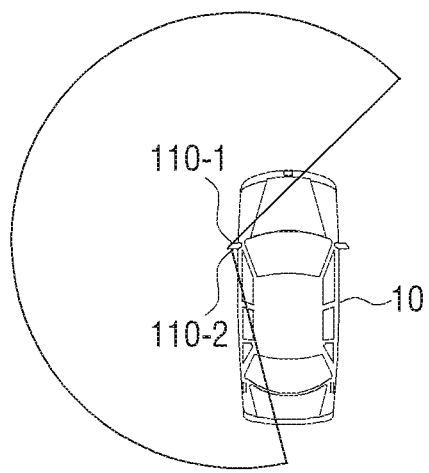

FIG. 7C illustrates a combination of the viewing ranges of the first camera 110-1 and the second camera 110-2 attached to the side mirror on the left side of the automobile 10.

Referring to FIG. 7C, as a result of combining the viewing ranges of the first camera 110-1 and the second camera 110-2 respectively including the wide-angle lens 112, a viewing range in a wide range is secured over the left front part/the left side/the left rear part.

Figure 7D:
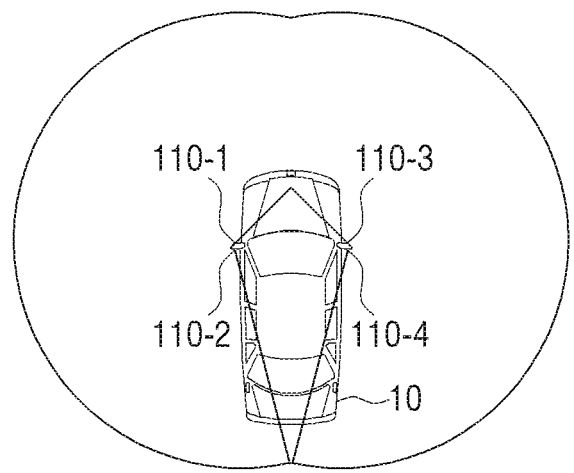

FIG. 7D illustrates a combination of the viewing ranges of the third camera 110-3 and the fourth camera 110-4 attached to the side mirror on the right side of the automobile 10 with the viewing range in FIG. 7C.

Referring to FIG. 7D, the first to fourth cameras 110-1, 110-2, 110-3, 110-4 respectively including the wide-angle lens 112 and attached to the side mirrors on the left/right sides can capture all of the wide regions in the front/rear/left/right parts around the vehicle.

Figure 1E:
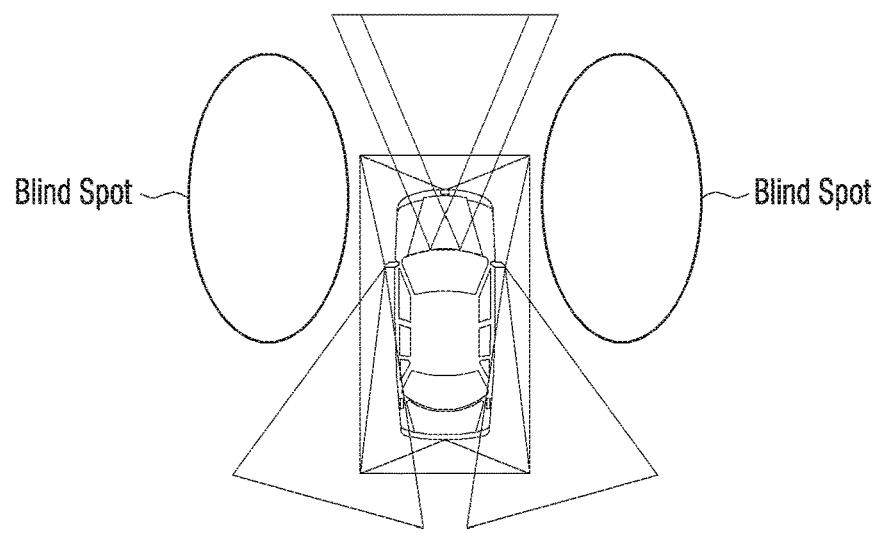

Comparing FIG. 7D with FIG. 1E illustrating a viewing range in the case of combining conventional camera systems, there is an effect that a previous blind spot is not a blind spot anymore. In particular, as a wide viewing angle can be secured not only in a horizontal direction but also in a vertical direction by using the wide-angle lens 112, a captured image can be secured not only for an adjacent area but also for a far area.

As described above, a wide region including not only the front/rear/left/right parts of the vehicle but also a near distance and a far distance can be captured with only one camera system 100 including only four cameras 110-1, 110-2, 110-3, 110-4 and one processor 120, the wiring structure and the arrangement structure in the system design become simpler than in the past, and thus there are effects of reducing the cost and securing a space. By virtue of such a characteristic, the camera system 100 in FIG. 6 can be used usefully in autonomous cars in the future.

The processor 120 in FIG. 6 has the same structure as the processor 120 illustrated and described through FIG. 2, and can perform the same operations. Meanwhile, the processor 120 in FIG. 6 has a difference in that it uses images captured from four cameras.

Specifically, the processor 120 may control the first to fourth cameras 110-1, 110-2, 110-3, 110-4 to capture the surroundings of the vehicle. Also, the processor 120 may identify objects around the vehicle on the basis of images captured through the first to fourth cameras 110-1, 110-2, 110-3, 110-4.

Here, data for a plurality of images captured through a plurality of image sensors (not illustrated) included in the first to fourth cameras 110-1, 110-2, 110-3, 110-4 may be transmitted to the processor 120 in the form of a signal/data of one output through a serializer integrated circuit (IC) (not illustrated). A serializer IC is a component for receiving in parallel input of a plurality of data/signals and outputting a serial data/signal which merged the data/signals. As a result of using a serializer IC, even if a hardware module including the plurality of cameras 110-1, 110-2, 110-3, 110-4 is used, only one system that integrally controls the hardware module through the processor 120 implemented as one ECU can be operated without a need to construct respective separate systems for each camera. Thus, the system is more economical in the aspects of the communication route and the installation cost.

As described above, the processor 120 may receive images captured at the first to fourth cameras 110-1, 110-2, 110-3, 110-4, identify objects included in the received images, identify the degree of danger of the objects on the basis of information on the identified objects, and control the vehicle on the basis of the identified degree of danger.

Meanwhile, the processor 120 may identify a main region in each of the images captured by the first to fourth cameras 110-1, 110-2, 110-3, 110-4 on the basis of at least one of the speed and the driving direction of the vehicle, and identify an object present near the vehicle on the basis of the identified main region. As a process of performing object recognition for images in a wide range captured by the four wide-angle cameras requires a relatively substantial amount of operations, this is for reducing the amount of operations for object recognition by recognizing an object only for the main region in each image captured by the cameras.

The processor 120 may perform object recognition only for the identified main region, and the main region may vary according to the speed and the driving direction of the vehicle.

For example, as the speed of the vehicle becomes higher, the size of the main region identified by the processor 120 may become smaller.

Figure 8A:
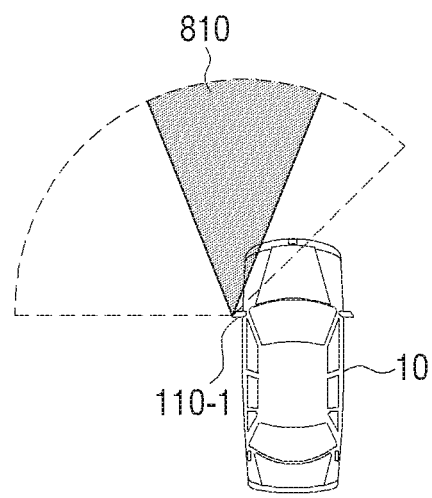
FIG. 8A and FIG. 8B are diagrams for illustrating an embodiment wherein a main region is identified within a captured image on the basis of the speed and the driving direction of a vehicle, and an object near the vehicle is recognized by using the identified main region.
Figure 8B:
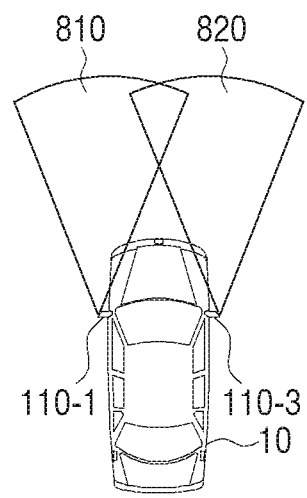

FIG. 8A and FIG. 8B are diagrams for illustrating a main region in case the automobile 10 runs at a relatively high speed.

Referring to FIG. 8A, the processor 120 may identify only an image region captured for a narrow range 810 corresponding to the front direction (: the driving direction) of the automobile 10 in the image of a wide viewing angle captured by the first camera 110-1 as the main region.

Referring to FIG. 8B, the processor 120 may identify only image regions captured for narrow ranges 810, 820 corresponding to the front direction of the automobile 10 in the images captured by the first camera 110-1 and the third camera 110-3 as the main regions.

In contrast, in case the automobile 10 runs at a relatively low speed unlike in FIG. 8A and FIG. 8B, the size of the main region in an image captured by each camera may become bigger compared to FIG. 8. Here, if the size of the main region is bigger than a predetermined value, the processor 120 may reduce the amount of operations for object recognition within the main region to smaller than or equal to the predetermined value.

Meanwhile, in case the automobile 10 runs at a relatively high speed, the processor 120 may identify an image region corresponding to the rear side region of the vehicle in the images captured by the second camera 110-2 and the fourth camera 110-4 as the main region.

Figure 9:
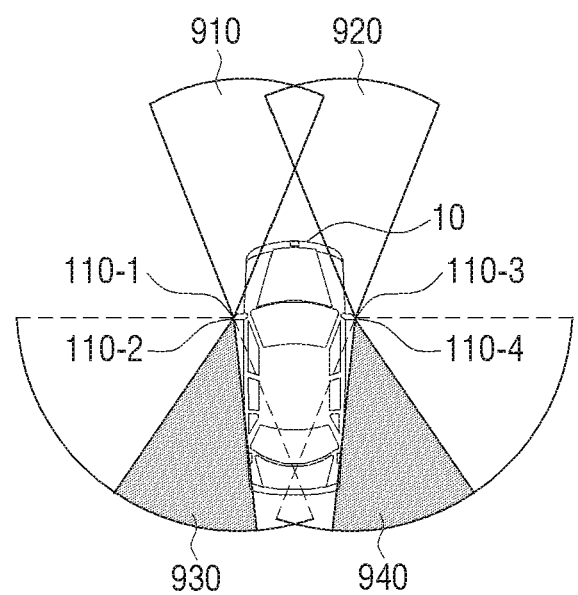
FIG. 9 is a diagram for illustrating an embodiment wherein a main region is identified within a captured image on the basis of the speed and the driving direction of a vehicle, and an object near the vehicle is recognized by using the identified main region.

Referring to FIG. 9, in case the vehicle runs at a high speed, the processor 120 may identify an image region corresponding to not only some regions 910, 920 among the regions captured by the first camera 110-1 and the third camera 110-3, but also the rear side regions 930, 940 of the vehicle among the regions captured by the second camera 110-3 and the fourth camera 110-4 as the main region.

As a result, whether an outside automobile is approaching to the rear side of the vehicle when changing the lane, etc. can be effectively identified by the vehicle 100 and/or the driver.

Specifically, the processor 120 may identify an image region corresponding to the regions 930, 940 as the main region only when a lane change signal of the automobile 10 which is the vehicle is operated. In this case, in case a left side lane change signal is operated, the processor 120 may identify an image region corresponding to the region 930 as the main region, and in case a right side lane change signal is operated, the processor 120 may identify an image region corresponding to the region 940 as the main region.

Meanwhile, the main region identified by the processor 120 may be changed according to the driving direction of the vehicle.

Figure 10A:
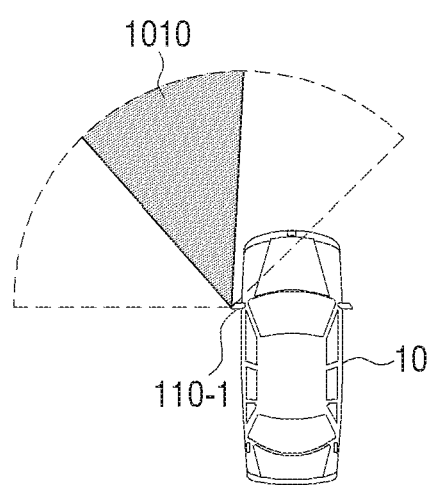
FIG. 10A and FIG. 10B are diagrams for illustrating an embodiment wherein a main region is identified within a captured image on the basis of the speed and the driving direction of a vehicle, and an object near the vehicle is recognized by using the identified main region.
Figure 10B:
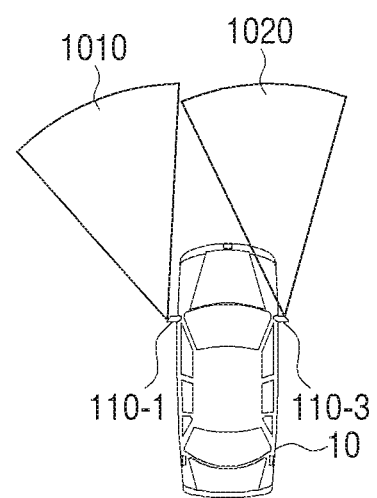

FIG. 10A and FIG. 10B are diagrams for illustrating main regions within images captured by the first camera 110-1 and the third camera 110-3 in case the vehicle is making a left turn at a high speed.

Referring to FIG. 10A, unlike in FIG. 8A, the processor 120 may identify an image region corresponding to the region 1010 that is tilted slightly more to the left than the front surface of the automobile 10 (based on the field of view of the driver) in the image captured by the first camera 110-1 as the main region.

Referring to FIG. 10B, the processor 120 may identify image regions corresponding to the regions 1010, 1020 that are tilted slightly more to the left than the front surface of the automobile 10 in the images captured by each of the first camera 110-1 and the third camera 110-3 as the main regions.

Meanwhile, the main region may vary according to how much different the driving direction of the vehicle is based on the front surface of the vehicle. If the degree of the left turn (the degree that the handle of the automobile 10 is turned) is bigger than the cases of FIG. 10A and FIG. 10B, the regions 1010, 1020 are located more to the left than in FIG. 10, and accordingly, the main region may be different from the cases of FIG. 10A and FIG. 10B.

The processor 120 may, for the main region identified within an image captured by the camera attached in a location corresponding to the driving direction of the vehicle among the first to fourth cameras 110-1, 110-2, 110-3, 110-4, perform more operations for object recognition than for the main regions identified within images captured by the other cameras, and identify an object present near the vehicle.

FIG. 11A to FIG. 11D are diagrams for illustrating an embodiment wherein, for a plurality of main regions identified on the basis of each of images captured by the first to fourth cameras 110-1, 110-2, 110-3, 110-4, the amount of operations for object recognition varies according to the driving direction of the vehicle.

Figure 11A:
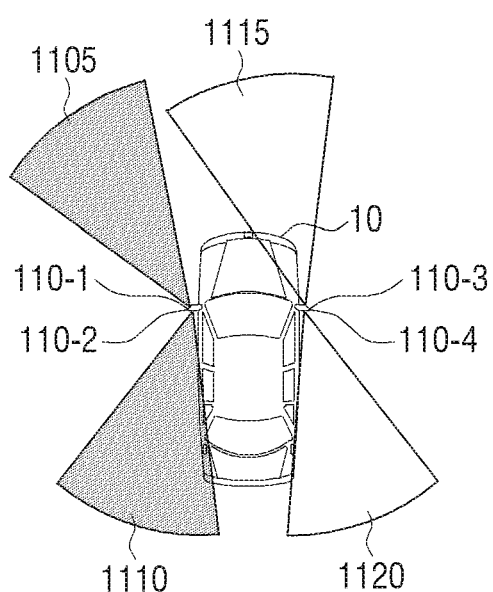
FIGS. 11A, 11B, 11C, and 11D are diagrams for illustrating an embodiment wherein, for a plurality of main regions respectively identified from images captured by four cameras, the amount of operations for object recognition varies according to the driving direction of a vehicle.
Figure 11B:
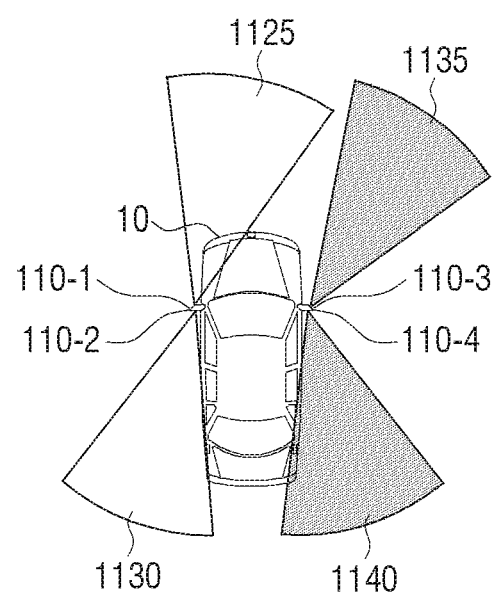

FIG. 11A assumes a case wherein the automobile 10 which is the vehicle makes a left turn at a high speed, and FIG. 11B assumes a case wherein the automobile 10 which is the vehicle makes a right turn at a high speed.

Referring to FIG. 11A, the processor 120 may identify an image region for the regions 1105, 1110, 1115, 1120 corresponding to the speed and the driving direction (the left turn) of the automobile 10 among the wide capturing regions of each of the first to fourth cameras 110-1, 110-2, 110-3, 110-4 as the main region, and recognize an object.

Meanwhile, in this case, for the main regions included in the images captured by the first camera 110-1 and the second camera 110-2 attached to the left side, the processor 120 may make the amount of operations for object recognition greater than for the main regions included in the images captured by the third camera 110-3 and the fourth camera 110-4, on the basis of the driving direction (the left turn) of the automobile 10.

Referring to FIG. 11B, the processor 120 may identify an image region for the regions 1125, 1130, 1135, 1140 corresponding to the speed and the driving direction (the right turn) of the automobile 10 among the wide capturing regions of each of the first to fourth cameras 110-1, 110-2, 110-3, 110-4 as the main region, and recognize an object.

Meanwhile, in this case, for the main regions included in the images captured by the third camera 110-3 and the fourth camera 110-4 attached to the right side, the processor 120 may make the amount of operations for object recognition greater than for the main regions included in the images captured by the first camera 110-1 and the second camera 110-2, on the basis of the driving direction (the right turn) of the automobile 10.

Figure 11C:
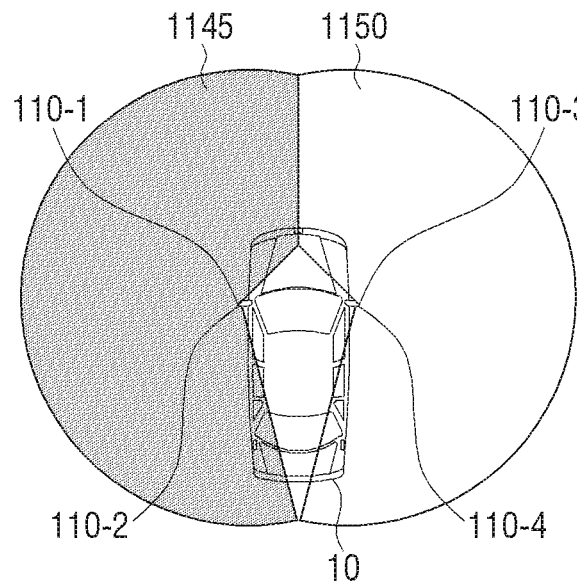
Figure 11D:
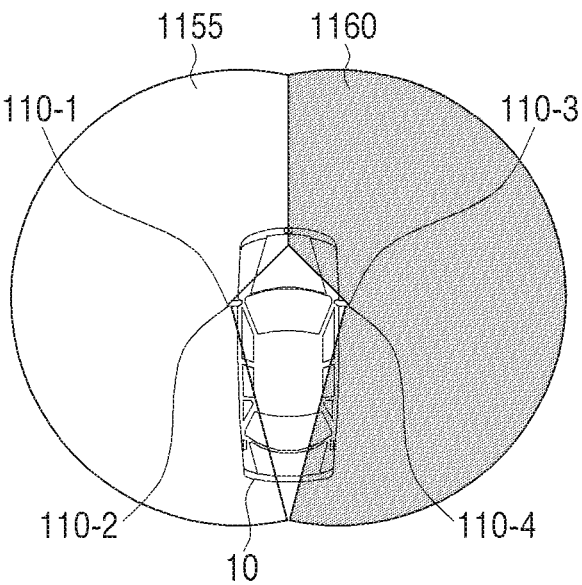

FIG. 11C assumes a case wherein the automobile 10 makes a left turn at a low speed, and FIG. 11D assumes a case wherein the automobile 10 makes a right turn at a low speed.

Referring to FIG. 11C, the speed of the automobile is slower than the case of FIG. 11A. Thus, the processor 120 may identify an image region corresponding to the relatively wide region 1145 among the regions captured by the first camera 110-1 and the second camera 110-2 and an image region corresponding to the relatively wide region 1150 among the regions captured by the third camera 110-3 and the fourth camera 110-4 as the main regions.

Here, for the main region corresponding to the left region 1145, the processor 120 may make the amount of operations for object recognition bigger than for the main region corresponding to the right region 1150, on the basis of the driving direction (the left turn) of the automobile 10.

In contrast, referring to FIG. 11D, as the driving direction of the automobile 10 is the right turn direction, for the main region corresponding to the right region 1160, the processor 120 may make the amount of operations for object recognition bigger than for the main region corresponding to the left region 1155.

Hereinafter, regarding FIG. 12 to FIG. 13, a control method for a camera system included in a vehicle according to the various embodiments of the disclosure will be described.

Figure 12:
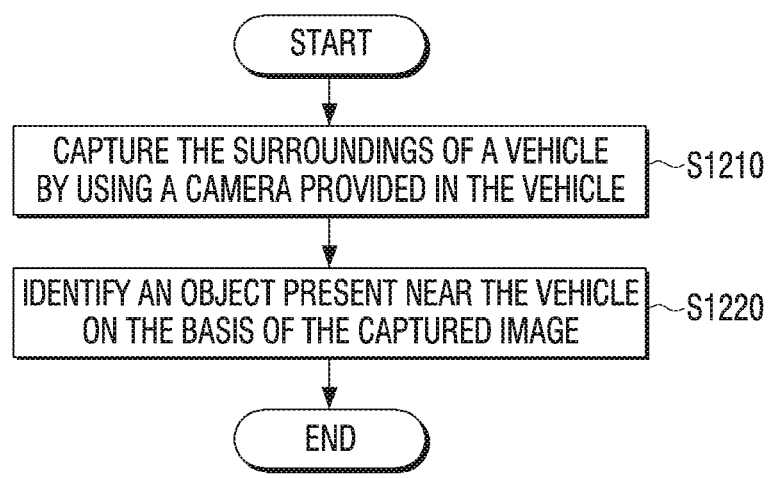
FIG. 12 is a flow chart for illustrating a control method for a camera system according to an embodiment of the disclosure.

FIG. 12 is a flow chart for illustrating a control method for a camera system according to an embodiment of the disclosure.

Referring to FIG. 12, in the control method, the surroundings of a vehicle may be captured by using a camera provided in the vehicle in operation S1210. Then, an object present near the vehicle may be identified on the basis of the image captured by the camera in operation S1220.

In this case, the camera for capturing the surroundings of the vehicle may include a wide-angle lens and a plurality of optical sensors for capturing a region within the viewing angle of the wide-angle lens.

Here, the wide-angle lens may be designed such that the number of optical sensors for capturing a region corresponding to a predetermined angle range, among a plurality of angle ranges wherein the viewing angle is divided into predetermined angles, differs from the number of optical sensors for capturing a region corresponding to a different angle range.

Specifically, the wide-angle lens may be designed such that the number of optical sensors for capturing a region corresponding to the predetermined angle range is greater than the number of optical sensors for capturing a region corresponding to the different angle range. As a result, in an image captured by the camera, the number of pixels included in a region captured in the predetermined angle range may be greater than the number of pixels included in a region captured in the different angle range.

Meanwhile, the predetermined angle range may be predetermined on the basis of the angle at which the camera is arranged in the vehicle. Also, the predetermined angle range may be predetermined on the basis of the structure of the vehicle and a field of view of a user who is riding the vehicle.

FIG. 13 is a flow chart for illustrating a control method for a camera system including four cameras provided in a vehicle according to an embodiment of the disclosure.

In the control method, the surroundings of the vehicle may be captured by using a first camera attached to the left side of the vehicle to capture the front part and the left side of the vehicle and a second camera attached to the left side of the vehicle to capture the rear part and the left side of the vehicle in operation S1310. Also, the surroundings of the vehicle may be captured by using a third camera attached to the right side of the vehicle to capture the front part and the right side of the vehicle and a fourth camera attached to the right side of the vehicle to capture the rear part and the right side of the vehicle in operation S1320.

Then, an object present near the vehicle may be identified on the basis of images captured by the first to fourth cameras in operation S1330. In this case, the degree of danger of the object may be identified on the basis of information on the identified object, and the vehicle may be controlled on the basis of the identified degree of danger.

In this case, each of the first to fourth cameras may include a wide-angle lens and a plurality of optical sensors for capturing a region within the viewing angle of the wide-angle lens. Also, the wide-angle lens may be designed such that the number of optical sensors for capturing a region corresponding to a predetermined angle range, among a plurality of angle ranges wherein the viewing angle is divided into predetermined angles, differs from the number of optical sensors for capturing a region corresponding to a different angle range.

Here, in the control method, a main region may be identified in each image captured by the first to fourth cameras, on the basis of at least one of the speed and the driving direction of the vehicle, and an object present near the vehicle may be identified on the basis of the identified main region. Specifically, an object may be identified only for the identified main region.

In this case, in identifying an object present near the vehicle, in case the size of the main region is bigger than a predetermined value, the amount of operations for object recognition within the main region may be reduced to smaller than or equal to the predetermined value.

Also, in identifying an object present near the vehicle, for the main region identified within an image captured by the camera attached in a location corresponding to the driving direction of the vehicle among the first to fourth cameras, more operations for object recognition may be performed than for the main regions identified within images captured by the other cameras.

The control method for a camera system described above through FIG. 12 to FIG. 13 can be implemented through the camera system 100 illustrated and described through FIG. 2 to FIG. 11.

The various embodiments described above may be implemented in a recording medium that can be read by a computer or an apparatus similar to a computer, by using software, hardware, or a combination thereof.

According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions.

In some cases, the embodiments described in this specification may be implemented based on software. According to implementation by software, the embodiments such as procedures and functions described in this specification may be implemented separately through a plurality of software modules, and at the same time, each of the aforementioned software modules may control the functions and operations of one or more components described in this specification.

Meanwhile, computer instructions for performing processing operations in the camera system 100 according to the aforementioned various embodiments of the disclosure may be stored in a non-transitory computer-readable medium. Computer instructions stored in such a non-transitory computer-readable medium make the processing operations in the camera system 100 according to the aforementioned various embodiments performed by the aforementioned specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer-readable medium such as a CD, a DVD, a hard disk, a blue-ray disk, a USB, a memory card, a ROM and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A camera system included in a vehicle, the camera system comprising:
    a camera provided in the vehicle to capture surroundings of the vehicle; and
    a processor for identifying an object present near the vehicle based on an image captured by the camera,
    wherein the camera comprises a wide-angle lens and a plurality of optical sensors for capturing a region within a viewing angle of the wide-angle lens, and
    the wide-angle lens is configured such that a number of optical sensors for capturing a region corresponding to a predetermined angle range, among a plurality of angle ranges wherein the viewing angle is divided into predetermined angles, is greater than a number of optical sensors for capturing a region corresponding to a different angle range,
    wherein the predetermined angle range is predetermined based on an angle at which the camera is arranged in the vehicle, a structure of the vehicle, and a field of view of a user of the vehicle,
    wherein the camera comprises:
        a first camera attached to a left side of the vehicle to capture a front part and the left side of the vehicle and a second camera attached to the left side of the vehicle to capture a rear part and the left side of the vehicle; and
        a third camera attached to a right side of the vehicle to capture the front part and the right side of the vehicle and a fourth camera attached to the right side of the vehicle to capture the rear part and the right side of the vehicle,
    wherein the processor is configured to:
        based on at least one of the speed or the driving direction of the vehicle, identify a main region within each image captured by the first, second, third and fourth cameras,
        identify an object present near the vehicle on based on the identified main region,
        in a case that the vehicle runs at a relatively high speed, identify only an image region captured for a narrow range corresponding to a front direction of the vehicle in the image of a wide viewing angle captured by the first camera as the main region or identify only image regions captured for narrow ranges corresponding to the front direction of the vehicle in images captured by the first camera and the third camera as the main region.

2. The camera system of claim 1,
wherein, in an image captured by the camera, a number of pixels included in a region captured in the predetermined angle range is greater than a number of pixels included in a region captured in the different angle range.

3. The camera system of claim 1,
wherein the processor is configured to:
based on a size of the main region being greater than a predetermined value, reduce a number of operations for identifying an object within the main region to be less than or equal to the predetermined value.

4. The camera system of claim 1,
wherein the processor is configured to:
for a main region identified within an image captured by a camera attached in a location corresponding to a driving direction of the vehicle among the first, second, third, and fourth cameras, perform more operations for object identification than for the main regions identified within images captured by the other cameras, and identify an object present near the vehicle.

5. The camera system of claim 1, further comprising:
a serializer integrated circuit (IC) configured to receive in parallel data corresponding to a plurality of images captured at the first, second, third, and fourth cameras and transmit the data to the processor.

6. The camera system of claim 1,
wherein the processor is configured to:
identify a degree of danger of the object based on information on the identified object, and
control the vehicle based on the identified degree of danger.

7. A control method for a camera system included in a vehicle, the method comprising:
capturing the surroundings of the vehicle using a camera provided in the vehicle; and
identifying an object present near the vehicle based on an image captured by the camera,
wherein the camera comprises a wide-angle lens and a plurality of optical sensors for capturing a region within a viewing angle of the wide-angle lens, and
the wide-angle lens is configured such that a number of optical sensors for capturing a region corresponding to a predetermined angle range, among a plurality of angle ranges wherein the viewing angle is divided into predetermined angles, is greater than a number of optical sensors for capturing a region corresponding to a different angle range,
wherein the predetermined angle range is predetermined based on an angle at which the camera is arranged in the vehicle, a structure of the vehicle, and a field of view of a user of the vehicle,
wherein the camera comprises:
a first camera attached to a left side of the vehicle to capture a front part and the left side of the vehicle and a second camera attached to the left side of the vehicle to capture a rear part and the left side of the vehicle; and
a third camera attached to a right side of the vehicle to capture the front part and the right side of the vehicle and a fourth camera attached to the right side of the vehicle to capture the rear part and the right side of the vehicle,
wherein the method further comprises:
based on at least one of the speed or the driving direction of the vehicle, identifying a main region within each image captured by the first, second, third, and fourth cameras, and
identifying an object present near the vehicle on based on the identified main region, and
wherein the identifying the main region comprises:
in a case that the vehicle runs at a relatively high speed, identifying only an image region captured for a narrow range corresponding to a front direction of the vehicle in the image of a wide viewing angle captured by the first camera as the main region or identifying only image regions captured for narrow ranges corresponding to the front direction of the vehicle in images captured by the first camera and the third camera as the main region.

8. The camera system of claim 1,
wherein the predetermined angle range is predetermined based on a blind spot where the field of view of a user does not reach.

9. The camera system of claim 1,
wherein the processor is configured to:
identify an image region corresponding to one side region of the vehicle as the main region only when a lane change signal of the vehicle is operated.

10. The camera system of claim 1,
wherein the processor is configured to:
based on the vehicle making a left turn at a high speed, identify an image region corresponding to a region that is tilted slightly more to a left than a front surface of the vehicle in an image captured by at least one of the first camera or the third camera as the main region.

11. The camera system of claim 1,
wherein the processor is configured to:
based on the vehicle making a left turn at a high speed, for the main region included in the images captured by the first camera and the second camera attached to the left side, perform more operations than for the main region included in the images captured by the third camera and the fourth camera, and
based on the vehicle making a right turn at a high speed, for the main region included in the images captured by the third camera and the fourth camera attached to the right side, perform more operations than for the main region included in the images captured by the first camera and the second camera.

12. The camera system of claim 1,
wherein the processor is configured to:
based on the vehicle making a left turn at a low speed, identify an image region corresponding to the relatively wide region among regions captured by the first camera and the second camera and an image region corresponding to the relatively wide region among regions captured by the third camera and the fourth camera as the main region and make an amount of operations for object recognition greater than for the main region corresponding to a right region, based on the driving direction of the vehicle, and based on the vehicle making a right turn at a low speed, make an amount of operations for object recognition greater than for the main region corresponding to the left region.

* * * * *